April 13, 1965     R. L. BURTNER     3,178,707
ELECTRONIC MAP MATCHING APPARATUS
Filed Feb. 12, 1949     3 Sheets-Sheet 1

INVENTOR.
RICHARD L. BURTNER
BY
*A H Oldham*
ATTY.

INVENTOR.
RICHARD L. BURTNER
ATTY.

3,178,707
ELECTRONIC MAP MATCHING APPARATUS
Richard Lee Burtner, Canton, Ohio, assignor to Goodyear Aerospace Corporation, a corporation of Delaware
Filed Feb. 12, 1949, Ser. No. 76,152
6 Claims. (Cl. 343—7)

This invention relates to navigational and control systems for aircraft, missiles, and the like, and, more particularly, is concerned with electronic means for matching a substantially instantaneous radar image of the terrain over which the aircraft is passing with a previously prepared map of the terrain of the course over which the aircraft is intended to fly.

It has been proposed heretofore in the patent application of James Byron Jones, filed December 6, 1947, now Patent No. 3,155,969, and entitled "Methods and Apparatus for Controlling Vehicle Movement," to mechanically and optically compare a substantially instantaneous image of the terrain over which a body is moving with a previously prepared map of opposite contrast of the terrain over which the body is intended to move, the apparatus including mechanism for correcting the movement of the body from the actual path to the intended path as determined by the amount of mismatch of the image and map.

It is the general object of the present invention to improve upon apparatus of the type above mentioned by providing electronic means for scanning between an actual position image and a proper course map and for returning a body, such as an aircraft, to its intended course.

Another object of the invention is the provision of apparatus of the indicated type which is relatively inexpensive, simple, and of relatively light weight, and which functions with exceeding rapidity to keep a body on the desired course.

The foregoing objects of the invention, and other objects which will become apparent as the description proceeds, are achieved by the provision of apparatus for automatically guiding an aircraft or the like including a cathode ray tube of the plan position indicator type for producing a substantially instantaneous radar image of the terrain over which the aircraft is moving, a previously prepared radar map of the terrain over which the aircraft is intended to move, the map being superimposed in relation to the image and of opposite contrast to the image but being of substantially the same scale and orientation. A photocell and amplifier are associated with the combination for measuring the amount of light flowing through the superimposed image and map. The apparatus includes, additionally, means for applying voltages to the deflection coils of the cathode ray tube to cause all points on the spoke of the cathode ray tube to simultaneously and rapidly execute small circles, discriminating and integrating means receiving an impulse from the amplifier and angular information from the voltage supplying means, means controlled by the discriminating and integrating means for repositioning the map with respect to the image, and means responsive to the repositioning of the map for supplying right-left and/or fore-aft controls to the aircraft.

For a better understanding of the invention, reference should be had to the accompanying drawings, wherein.

Having more particular reference to the drawings, the apparatus of the invention includes a pre-prepared radar map 1 (actually a series of separate maps) of the terrain of the course over which an aircraft or the like is intended to fly, a substantially instantaneous radar image 2 of the terrain over which the aircraft is actually flying, together with mechanism for matching the image to the map in such a manner as to obtain fore-aft and/or left-right positional information. The generated information relates to the position of the radar image 2 to the reference map 1 so that the position of the aircraft may be accurately determined and correctional action taken to return the aircraft to its intended course.

Figure 1:
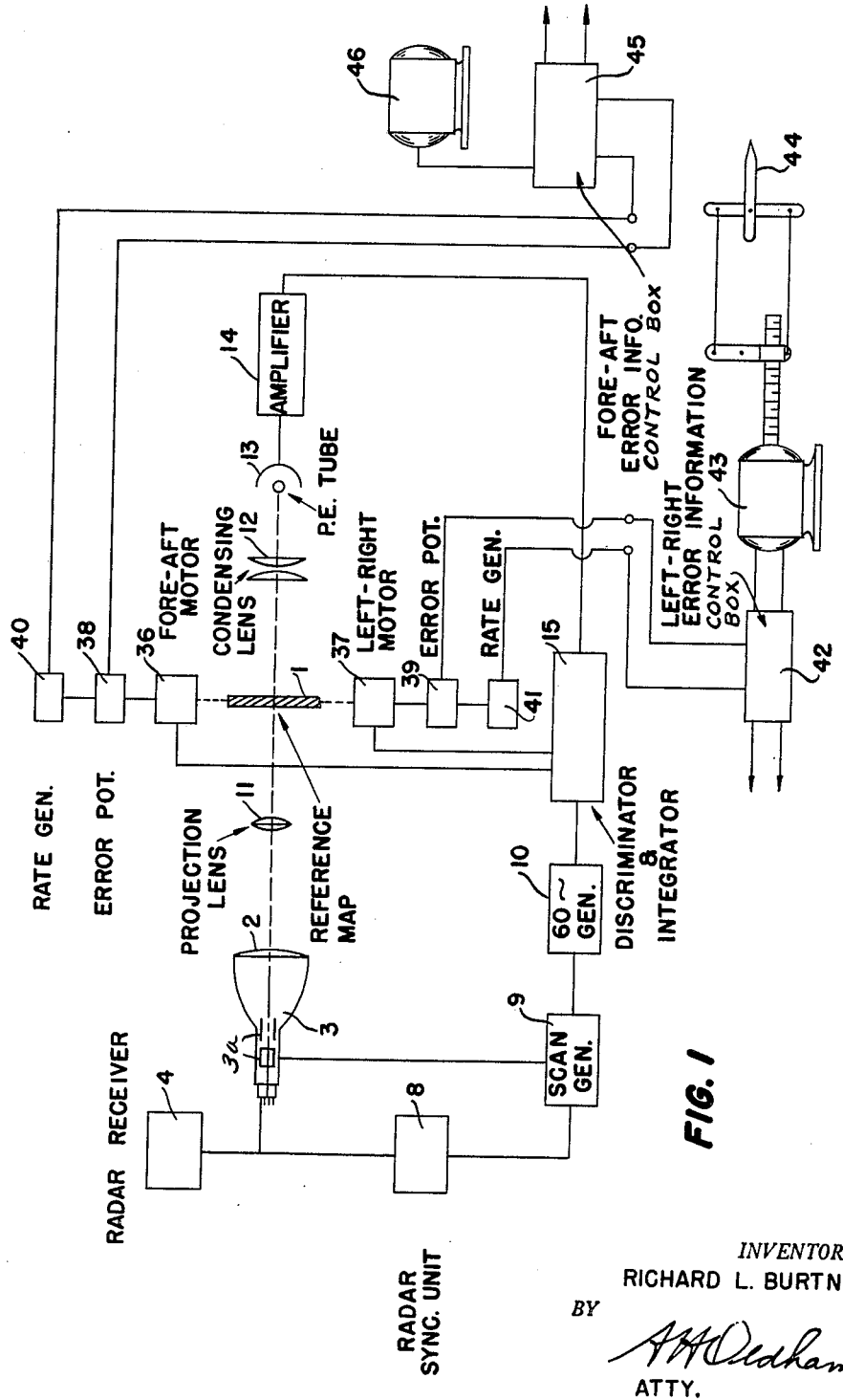
FIG. 1 is a diagrammatic wiring diagram of one typical embodiment of the apparatus.

FIG. 1 of the drawings is a block diagram of all of the necessary elements of the apparatus. The radar image 2 is produced by a cathode ray tube 3 which has a short persistence screen (time .03 second to the 1/e value) and the tube is intensity modulated by the radar receiver 4. The sweep used on the tube is modified plan position indicator, and is shown in greater detail in FIG. 2. More specifically, it might be said that a conventional polar scan is employed, in the embodiment of the invention illustrated, wherein the electron beam traces successive radial lines on the screen of the cathode ray tube, so that the screen is scanned by a rotating vector or spoke having its origin at the center of the screen.

Figure 2:
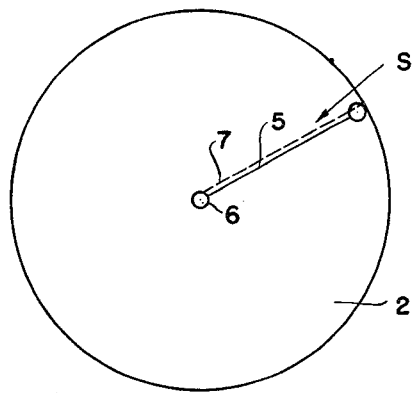
FIG. 2 is a plan view of the plan position indicator cathode ray tube associated with the apparatus.
Figure 3:
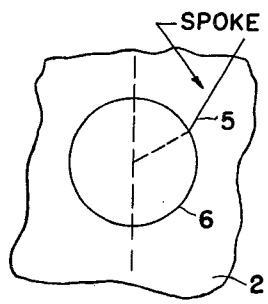
FIG. 3 is a fragmentary enlarged view of a portion of the showing of FIG. 2.

The spoke 5 of the tube sweep rotates slowly about the center of the tube in synchronism with the radar receiver antenna, as is normally the case, but in addition, voltages are fed to the electron beam deflection means 3A of the tube 3 which cause all points on the spoke to simultaneously and rapidly execute small circles. One such circle is indicated in FIGS. 2 and 3 by the numeral 6. The solid line 5 represents the spoke during one line sweep while the dotted line 7 represents the spoke produced during the next sweep, and so on, around the circle 6. The line sweep happens very rapidly as compared to the relatively slow angular movement of the antenna scan so that during the time every portion of the spoke 5–7 is executing the relatively large number of line sweeps to complete the circle 6, the angle of the antenna scan changes only a very small amount. In practice, the relative rate may be as follows:

Antenna scan rate equals 120° per second, voltage frequency for deflection coils of cathode ray tube equals 60 cycles per second. Pulse repetition rate for generating each line sweep equals 2,000 per second.

The above described indicator scan is generated by conventional means per se well known to those familiar with the art and are shown in FIG. 1 in block diagram form only as including a radar synchronizing unit 8, a scan generator 9, and a sixty cycle generator 10.

The apparatus of FIG. 1 also includes a projection lens 11 positioned between the cathode ray tube 3 and the map 1, and positioned behind the map 1 is a condensing lens 12, a photo-electric tube 13 and an amplifier 14 which is connected to a discriminator and integrator 15.

Figure 4:
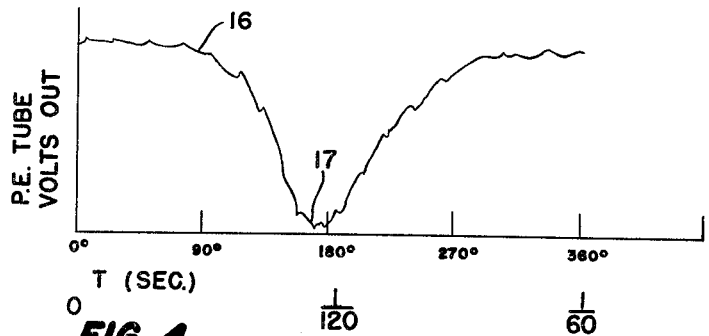
FIG. 4 is a graphical representation of the match point of the image and map of the apparatus.

Now assuming that the radar image 2 is being produced upon the cathode ray tube 3, and that the radar image is being given the circular scanning action above described, a voltage output will appear at the photo-electric tube 13 which will be amplified in the amplifier 14. Now assuming, further, that the map 1 is slightly displaced from a match position with respect to the radar image 2 at the start of the scanning action, then a curve 16 as shown in FIG. 4 may be expected during a given interval of time, and specifically the time required for the circle 6 to be completed. FIG. 4 shows as the abscissa the angular velocity of the shifting voltage which causes the spoke 5 to move in the circle 6 (see FIGS. 2 and 3). The angular velocity is plotted against the voltage output of the photo-electric tube 13, and the resultant curve 16 shows a matched point between the radar screen 2 and the map 1 at a point 17 which, in the particular example of radar image and map illustrated occurs at approximately 180° around the scanning circle 6.

It will be understood that at the match point 17 the voltage output of the photo-electric tube 13 drops practically to zero for the reason that the dark portions of the map 1 match and cover the light portions of the image 2 to substantially cut off the flow of light to the photo-electric tube 13. At the other portions of the curve 16 where the image 2 and the map 1 are not matching, enough light flows through to the photo-electric tube 13 to generate the fairly sizable voltage indicated in the curve 16 at other than the match point 17.

Figure 5:
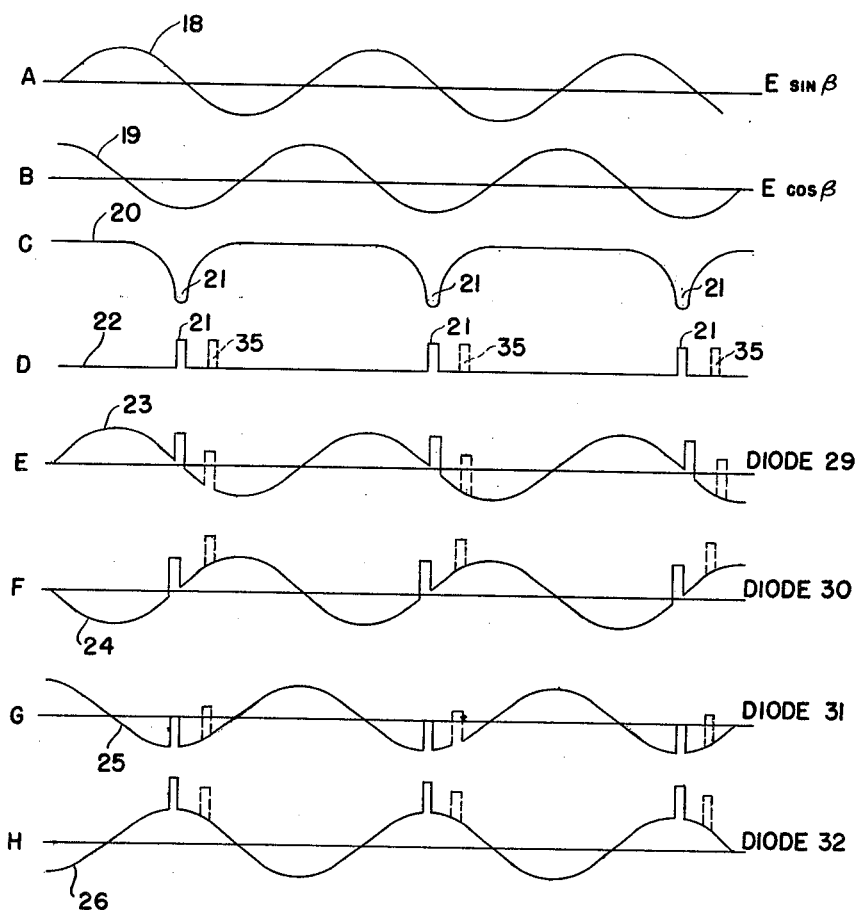
FIG. 5 is a graphical representation of the wave forms present in various portions of the apparatus.

In FIG. 5 are illustrated the various wave forms generated in the parts of the system. More particularly, the numerals 18 and 19 indicate respectively the sine and cosine voltages produced in the 60 cycle generator 10, these voltages being 90° out of phase, and the voltages being used as the shifting voltages on the electron beam deflector means of the cathode ray tube 3, as well as supplying reference voltages to the discriminator 15.

Curve 20 (FIG. 5) represents the output of the photo-electric tube 13 when the image 2 and map 1 are not in the matched position, but with the image 2 moving periodically near or through the match point, such match points being indicated by the numerals 21. It should be understood that when a match is obtained between the image 2 and the map 1 by the repositioning of the map that thereafter (until mismatch again develops) there are no well defined minima such as shown at 21 in curve 20, and while there are minor irregularities, these tend to cancel out over a period of several cycles.

By amplifying with the amplifier 14 the voltage output of the photo-electric cell 13, and by clipping the curve 20, a pulse output from the amplifier 14 to the discriminator 15 of the type shown in wave curve 22 may be produced. The step of clipping the curve 20 to produce the curve 22 is not strictly necessary, but will aid in understanding the operation of the present invention.

Figure 6:
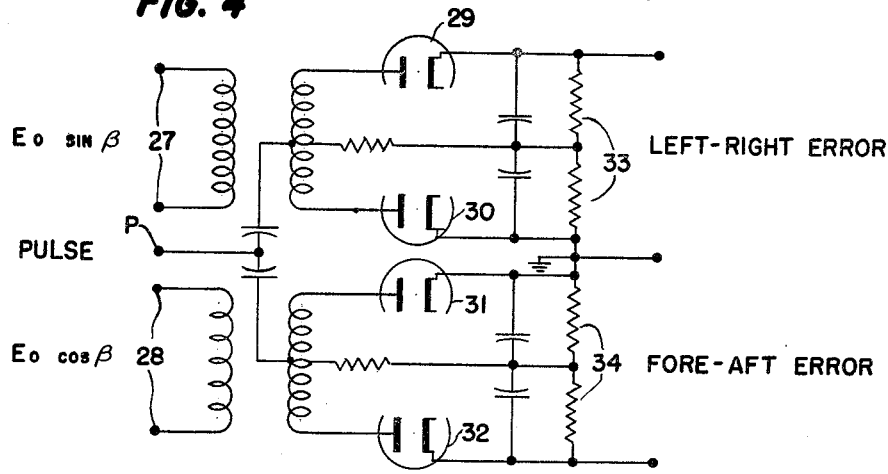
FIG. 6 is a schematic wiring diagram of the discriminating and integrating means shown in box form in FIG. 1.

Curves 23, 24, 25 and 26 represent voltages appearing at various points in the circuit of FIG. 6, namely, the discriminator and integrator circuit of box 15. The input to the circuit of FIG. 6 consists of the sine voltage of curve 18 applied to the terminals 27, and the cosine voltage of curve 19 applied to the terminals 28, and the pulses at match point taken from the photo-electric tube 13 output, as indicated in either curve 20 or curve 22 of FIG. 5, applied to terminal P. Note that the pulses 21 are applied to diodes 29, 30, 31 and 32 of the circuit of FIG. 6 in phase while the sine and cosine voltages are fed to their respective diodes in such a manner as to produce voltages 180° apart as shown in curves 23, 24, 25 and 26. The pulses 21 of the match point between the image 2 and the map 1 fall on diodes 29 and 30 (in the specific example under consideration) at a time when the voltage due to the sine wave are both zero, therefore the output of the diodes 29 and 30 remains balanced and no right-left error voltage appears across the equal resistances 33 connected in the output circuit of the diodes 29 and 30. The absence of any left-right error voltage is correct and in accord with the fact that the image 2 was matched with the map 1 after approximately 180° of travel of the spoke 5 around the circle 6. In other words, at the particular match point of the image and map selected for purposes of illustration, the image 2 and map 1 were not misaligned in a lateral direction, but only in a fore and aft direction, and hence no right-left error was present.

On diodes 31 and 32, however, the pulses 21 fall at a time when the voltages produced by the cosine input are maximum negative and positive (see curves 25 and 26). The positive pulse 21 added to the negative voltage of wave curve 25 does not change the average current flowing through diode 31, but the positive pulse added to the positive voltage of wave curve 26 increases the average current flowing through diode 32. The result is an unbalance is present in the output circuit of the diodes 31 and 32 including resistances 34 which produces a fore-aft voltage.

Now assuming that instead of having a match between the image 2 and the map 1 at the point heretofore described, namely, when the spoke 5 has traveled 180° around the circle 6 (see FIGS. 2, 3 and 4), if the image 2 matches with the map 1 when the spoke 5 has traveled say 225° around the circle 6, then a matching impulse will occur in wave curves 20 and 22 as shown by dotted lines 35 in wave curve 22. When these dotted pulses 35 are imposed upon curves 23, 24, 25 and 26, there will be produced in the output circuits of the diodes of FIG. 6 an unbalanced error voltage in both fore-aft and left-right directions. The magnitude of the error voltage appearing in the output of FIG. 6 will indicate the amount of mismatch, and the polarity of the output voltage will indicate the direction of mismatch between the image 2 and the map 1.

The unbalanced voltages appearing at the output of the discriminator circuit of FIG. 6 are used to control the fore-aft motor 36 and the left-right motor 37 which shift the reference map 1 by way of appropriate gearing (not shown) either up or down or left or right or both to bring the map substantially into a match with the radar image 2. As the reference map 1 is brought back into match position with the substantially instantaneous radar image 2, the motors 36 and 37 drive, resepectively, through appropriate gear trains, error potentiometers 38 and 39 and rate generators 40 and 41, the latter being preferably included for stabilizing purposes.

The right and left error information generated by the potentiometer 39 and the rate generator 41 is passed to a control box 42 controlling a servo-motor 43 which may be used for example to move a rudder 44 on the aircraft either right or left to return the aircraft to its on course position. The fore-aft error information generated by the potentiometer 38 and the generator 40 can be used in any of several ways. For example, this error information can be passed to a control box 45 connected to a servo-motor 46 which will shut off the aircraft motor, depress the aircraft elevators, or perform other like operations indicative of or for controlling range of the aircraft.

As an alternative to shifting the map 1 to achieve a match, the map may be left stationary and the radar image 2 can be brought to a match with the map by shifting the centering of the radar image 2 on the cathode ray tube 3. This arrangement has the advantage of eliminating the motors 36 and 37 but complicates the circuit necessary to produce error and rate information.

Guidance by the apparatus described for any considerable distance requires that new reference maps 1 be periodically introduced. This is because the shape and size of a given target on the radar screen 2 changes as to aspect and distance as the aircraft travels over a given terrain. The switching of a new refernce map for the old may be accomplished automatically by allowing the map or the voltage from the fore-aft error potentiometer 38 to trigger a mechanism which snaps a new map into position and simultaneously removes the old.

The apparatus heretofore described requires that the radar image and the reference may be substantially to the same scale and orientation. The orientation is accomplished to a fair degree of accuracy by stabilizing the antenna or the cathord ray tube 3, or both, with a flux-gate compass.

It will be recognized that the various objects of the invention have been achieved by the provision of relatively simple, automatically operating apparatus for electronically matching a substantially instantaneous radar image with a reference map, and to use any error information generated in the matching operation to restore an aircraft or other body to a desired course or flight path. The apparatus is relatively light in weight and automatically effects the rapid periodic readjustment of the course. The invention has particular application to the control of guided missiles, but likewise has distinct advantages in maintaining aircraft and the like on selected courses in fog, darkness, and the like, and in guiding an aircraft in for a landing automatically even if there is a pilot aboard.

While certain representative embodiments and details have been shown for the purpose of illustrating the invention, it will be apparent to those skilled in this art that various changes and modifications may be made therein without departing from the spirit or scope of the invention.

I claim:

1. Apparatus for automatically guiding an aircraft or the like including a cathode ray tube of the plan position indicator type for producing a substantially instantaneous radar image of the terrain over which the aircraft is moving, a previously prepared radar map of the terrain over which the aircraft is moving and being superimposed in relation to the image, the map being of opposite contrast to the image but being of substantially the same scale and orientation, a photocell and amplifier for measuring the amount of light flowing through the superimposed image and map, means for applying voltages to the electron beam deflection means of the cathode ray tube to cause all points on the sweep of the cathode ray tube to simultaneously and rapidly execute small circles, discriminating and integrating means receiving an impulse from the amplifier and angular information from the voltage applying means, means controlled by the discriminating and integrating means for repositioning the map with respect to the image, and means responsive to the repositioning of the map for supplying left-right and fore-aft controls to the aircraft.

2. Apparatus for automatically guiding an aircraft or the like including means for producing a substantially instantaneous radar image of the terrain over which the aircraft is moving, a previously prepared radar map of the terrain over which the aircraft is moving and being superimposed in relation to the image, the map being of opposite contrast to the image but being of substantially the same scale and orientation, a photo-cell and amplifier for measuring the amount of light flowing through the superimposed image and map, means for electronically moving the radar image in rapidly completed small circles, discriminating and integrating means receiving an impulse from the amplifier and angular information from the radar image moving means, means controlled by the discriminating and integrating means for repositioning the map with respect to the image, and means responsive to the repositioning of the map for supplying left-right and fore-aft controls to the aircraft.

3. Apparatus for automatically guiding an aircraft or the like including means for producing a substantially instantaneous radar image of the terrain over which the aircraft is moving, a previously prepared radar map of the terrain over which the aircraft is moving and being superimposed in relation to the image, the map being of opposite contrast to the image but being of substantially the same scale and orientation, a photocell and amplifier for measuring the amount of light flowing through the superimposed image and map, means for electronically moving the radar image in rapidly completed small circles, discriminating and integrating means receiving an impulse from the amplifier and angular information from the radar image moving means, means controlled by the discriminating and integrating means for repositioning the map with respect to the image, and means responsive to the repositioning of the map for bringing the aircraft back on course.

4. Apparatus for automatically guiding an aircraft or the like including means for producing a substantially instantaneous radar image of the terrain over which the aircraft is moving, a previously prepared radar map of the terrain over which the aircraft is moving and being superimposed in relation to the image, the map being of opposite contrast to the image but being of substantially the same scale and orientation, light responsive means for measuring the amount of light flowing through the superimposed image and map, means for electronically moving the radar image in rapidly completed small circles, discriminating and integrating means receiving an impulse from the light responsive means and angular information from the radar image moving means, means controlled by the discriminating and integrating means for repositioning the map with respect to the image, and means responsive to the repositioning of the map for bringing the aircraft back on course.

5. In apparatus of the type described the combination of a reference map, means for producing a substantially instantaneous radar image to substantially the same scale and orientation as the map but of opposite contrast, optical means superimposing the map and image, electronic means for causing the radar image to scan the map, means responsive to substantially a match between the image and map, means controlled by the electronic means and the match responsive means for effecting relative movement between the image and map to establish substantially a match, and means controlled by the said relative movement to return the controlled body to on course position.

6. In apparatus of the type described the combination of a reference map, means for producing a substantially instantaneous radar image to substantially the same scale and orientation as the map but of opposite contrast, optical means superimposing the map and image, electronic means for causing the radar image to scan the map, means responsive to substantially a match between the image and map, and means controlled by the electronic means and the match responsive means for effecting relative movement between the image and map to establish substantially a match.

References Cited by the Examiner

UNITED STATES PATENTS

| 2,080,511 | 5/37 | Sjostrand | 343—112 |
| 2,403,729 | 7/46 | Loughren | 343—10 X |
| 2,406,751 | 9/46 | Emerson | 343—11 |
| 2,426,184 | 8/47 | Deloraine et al. | 343—118 |
| 2,428,427 | 10/47 | Loughren | 343—11 |
| 2,499,349 | 3/50 | Ayres | 343—7 |
| 2,506,127 | 5/50 | Allen | 343—6 X |
| 2,523,328 | 9/50 | Ranks | 343—1 |
| 2,526,682 | 10/50 | Mulberger et al. | 343—9 |

CHESTER L. JUSTUS, *Primary Examiner.*

NORMAN H. EVANS, JAMES L. BREWRINK,
*Examiners.*